United States Patent [19]
Isaksen et al.

[11] 3,980,733

[45] Sept. 14, 1976

[54] POWDER COATING RESIN PROCESS

[75] Inventors: Robert A. Isaksen, Chardon, Ohio; Frederic J. Locke, East Longmeadow, Mass.; John L. Smith, Springfield, Mass.; George T. Spitz, Longmeadow, Mass.

[73] Assignee: Monsanto Company, St. Louis, Mo.

[22] Filed: Oct. 4, 1974

[21] Appl. No.: 511,953

Related U.S. Application Data

[63] Continuation-in-part of Ser. No. 317,901, Dec. 26, 1972, abandoned.

[52] U.S. Cl. .............................. 260/850; 260/851; 260/856; 427/195; 427/375; 427/385
[51] Int. Cl.² ................ C08L 61/24; C08L 61/26; C08L 61/28
[58] Field of Search ................ 260/850, 851, 856; 117/21

[56] References Cited
UNITED STATES PATENTS

| | | | |
|---|---|---|---|
| 3,759,854 | 9/1973 | Chang | 260/850 |
| 3,804,920 | 4/1974 | Cunningham et al. | 260/850 |
| 3,806,480 | 4/1974 | Leonard | 260/850 |
| 3,842,021 | 10/1974 | Grant et al. | 260/850 |

FOREIGN PATENTS OR APPLICATIONS

| | | | |
|---|---|---|---|
| 766,819 | 1/1957 | United Kingdom | 260/856 |

*Primary Examiner*—John C. Bleutge
*Attorney, Agent, or Firm*—R. B. Blance; E. P. Grattan; J. C. Logomasini

[57] ABSTRACT

A curable powder resin composition comprising an aminoplast and a polyester or polyacrylic resin. The aminoplast is a condensate of a methylolurea or methylolaminotriazine with an aliphatic alcohol and a reactive compound containing at least one reactive group selected from the group consisting of hydroxyl and amide.

6 Claims, No Drawings

POWDER COATING RESIN PROCESS

This application is a continuation in part of application Ser. No. 317,901, filed Dec. 26, 1972 abandoned.

BACKGROUND OF THE INVENTION

1. Field of the Invention

The present invention is in the field of curable powder coating resin compositions comprising a blend of aminoplast crosslinking agents and polymeric materials containing active hydrogen groups, suitable for powder spray applications.

2. Description of the Prior Art

Powder coatings are prepared from powdered resins applied by electrostatic or fluidized bed processes. In the former, the powdered resin is applied by electrostatic spray gun to a substrate of opposite charge which is then baked to fuse the powder particles into a smooth coating. In the latter process the preheated substrate is immersed in a fluidized mass of powdered resin so that the powder adheres to the substrate which is then baked to fuse the powder into a smooth coating. Powder coatings possess significant advantages over conventionally applied solvent finishes in economy, ease of application, single coat potential and absence of sagging. Moreover, air pollution is eliminated.

Thermoplastic and thermosetting resins may be applied by powder coating techniques. Thermosetting powders offer several advantages; namely, they require no primer, they yield tough flexible films of superior chemical and solvent resistance, they provide adequate protection to the substrate in thinner films, they accept higher pigmentation levels and they may be applied at lower curing temperatures.

Powdered epoxy resins have been successfully developed for powder coatings. Unfortunately, epoxy coatings weather poorly, rapidly losing gloss. Hence, for exterior uses, thermosetting acrylic or polyester powder coatings would be preferred. Attempts to produce such coatings have been based on systems which contain aminoplast crosslinking agents and acrylic or polyester resins with reactive hydrogen groups such as hydroxyl, carboxyl, or amide groups. To date, such systems containing conventional aminoplasts; for example, methylol and alkoxymethyl derivatives of ureas, melamines and benzoguanamines, have been unsatisfactory because of poor package stability. The poor package stability is associated with the plasticizing and cold flow effects of the conventional low molecular weight aminoplasts, causing clumping and sintering or fusing of the powdered resin. Clumping and sintering are undesirable since they impair fluidization of the powder during application to the substrate, they cause segregation of the powder into varying degrees of density, and they contribute to non-uniform coatings with decreased gloss. The cold flow may be avoided by cutting back on the quantity of aminoplast but with sacrifice in physical properties and solvent resistance of the cured film, or by the use of high molecular weight acrylic or polyester resins, an expedient which impairs fusibility of the powder and flow so that the final coating lacks gloss and coherence, or by the use of acrylic or polyester resins of high glass transition temperature so that the glass transition temperature of the powdered composition is increased but the cured film is embrittled and loses impact strength.

Thus, there is a need for powdered resin compositions comprising a blend of aminoplast crosslinking agents and acrylic or polyester materials containing active hydrogen groups, which have adequate package stability and flowability and which yield powder coatings which when cured have adequate physical properties and solvent resistance.

SUMMARY OF THE INVENTION

The curable powder resin compositions of this invention comprise a blend of aminoplast crosslinking agent with glass transition temperature at least −10°C. and a reactive polymeric material containing at least one class of reactive groups selected from the group consisting of alcoholic hydroxyl groups and amide groups wherein the amount of the reactive groups is at least 0.13 percent by weight and not more than 18 percent by weight of the reactive polymeric material. The powder resin blend has sufficient aminoplast crosslinking agent to give a cured coating with adequate physical properties and solvent resistance. The weight ratio of aminoplast crosslinking agent to reactive polymeric material is in the range of 15:85 to 30:70. The aminoplast crosslinking agent, however, differs from conventional aminoplasts by having a higher glass transition temperature allowing the blend to have a sintering temperature above 40°C. and, hence, a better package stability than blends containing conventional aminoplasts.

The aminoplast crosslinking agents comprise a condensate of a methylolamino compound such as a methylolurea or methylolaminotriazine with a first compound which is a $C_1$ to $C_4$ aliphatic alcohol and a second compound which contains at least one reactive group selected from the group consisting of hydroxyl or amide. The molar ratio of the aliphatic alcohol to the methylolamino compound is at least 2. The molar ratio of the methylolamino compound to the second compound is between about 1:0.5 and about 1:2 when the second compound contains one reactive group per molecule and is between about 1:0.5 and about 1:1.5 when the second compound contains two or more reactive groups per molecule. The methylolamino compound contains no more than one unmethylolated N-H bond per molecule. At least 50 percent of the methylol groups of the methylolamino compound are condensed with the first and second compounds. The glass transition temperature of the condensed aminoplast crosslinking agent is between −10° and 100°C.

The reactive polymeric material which is the second component of the curable powder resin composition has a glass transition temperature in the range of 60° to 100°C. and a molecular weight less than 25,000, preferably, between 500 and 10,000.

The curable powder resin compositions are applied to substrates by electrostatic spray coating. The coated substrate is baked at a temperature between 120° and 220°C. for from 10 to 60 minutes. The cured surface coating exhibits good solvent resistance and toughness.

DESCRIPTION OF THE PREFERRED EMBODIMENTS

The first component of the curable powder resin composition of the present invention, the aminoplast crosslinking agent, is the alkylated reaction product of a methylolated urea or an aminotriazine with a coreactant containing at least one class of reactive groups selected from the group consisting of hydroxyl groups and amide groups.

The methylolated ureas and aminotriazines are prepared by conventional alkaline addition reaction of the urea or aminotriazine with formaldehyde. The preferred reactants are urea, melamine and benzoguanamine. Methylolation is carried out so that on average no more than one N-H bond per molecule of urea or aminotriazine remains unreacted. Preferably, substantially complete methylolation is carried out so that the preferred reactants yield hexamethylolmelamine and tetramethylol-benzoguanamine, respectively.

The methylol derivatives are then condensed under conventional acid conditions with a co-reactant of number average molecular weight up to 500 containing at least one class of reactive groups selected from the group consisting of hydroxyl groups and amide groups. Preferred classes of co-reactants are: Aliphatic diols and polyols such as ethylene glycol, 1,2-propanediol, propylene glycol, neopentyl glycol, 1,4-bis(hydroxymethyl) cyclohexane, hydrogenated bisphenol-A, glycerol, sucrose; aliphatic diamides and polyamides such as succinamide and adipamide; aromatic alcohols such as benzyl alcohol, oligomeric poly(styrene-co-allyl alcohol); aromatic amides such as benzamide, o-toluamide, m-toluamide, p-toluamide, terephthalamide; aromatic sulfonamides such as benzenesulfonamide, o-toluenesulfonamide, m-toluenesulfonamide, p-toluenesulfonamide and terephthalsulfonamide; and phenols such as phenol, o-cresol, m-cresol, p-cresol, and $\alpha$- and $\beta$-naphthol.

In the reaction with monofunctional co-reactant such as benzyl alcohol, the molecular ratio of methylolated urea or methylolated aminotriazine to monofunctional co-reactant is in the range of 2:1 to 1:2, preferably between about 1:1 and about 1:2. With polyfunctional co-reactant such as ethylene glycol and terephthalamide, the molecular ratio of methylolated urea or methylolated aminotriazine to polyfunctional co-reactant is between 2:1 and 2:3, preferably between about 2:1 and about 1:1.

The condensation is carried out under conventional acid conditions in the presence of a $C_1$ to $C_4$ aliphatic alcohol which also condenses with the methylolamino compound so that the reaction product contains alkoxymethyl groups, also. Alternatively, the condensation may be carried out in separate steps in any order and it is often convenient to start with commercially available $C_1$ to $C_4$ alkylated methylolated ureas or aminotriazines which may contain up to 50 weight percent of dimers and trimers and condense them with the monofunctional or polyfunctional co-reactants to obtain the desired condensates.

Condensation of the aminomethylol compound may be carried out so that all the methylol groups are reacted. At least half the methylol groups are reacted so that the curable powder resin composition will have adequate shelf-stability without premature cure. It is preferred to have at least two $C_1$ to $C_4$ alkoxy groups per molecule of aminomethylol compound to obtain a balanced reactivity in the aminoplast crosslinking agent. The aliphatic alcohol and reactive compound are selected so that when they are reacted with the methylolamino compound in the molar ratios set forth above, the condensate has a glass transition temperature between $-10°$ and $100°C.$ and more preferably between $10°$ and $80°C.$ so that when the condensate is formulated with the polymeric component of the curable powder resin composition of the present invention, the blend yields a powder with a sintering or fusion temperature in the range of $40°$ to $100°C.$ The second component of the curable powder resin compositions of the present invention is a reactive polymer containing at least one class of reactive groups selected from the group consisting of alcoholic hydroxyl groups, carboxyl groups and amide groups and is preferably a polyester resin or an acrylic resin for exterior coating applications.

When polyester resins are used they are prepared by reacting a polycarboxylic acid including dicarboxylic acids with a polyhydric alcohol, including the glycols. The polycarboxylic acids may be either saturated, i.e., free of non-benzenoid unsaturation, or they may be ethylenically unsaturated.

If the polyester resins used contain preponderant amounts of the polycarboxylic acid, such polyester should be reacted with dihydric alcohol until an acid number of between about 1 to 25 is reached and, preferably, an acid number of between about 3 to 10. If the polyester resin is prepared by using a preponderance of alcoholic hydroxyl groups, the ingredients forming the polyester are permitted to react until a hydroxyl number of not less than about 5 is reached and, preferably, between about 11 and 200. The polyester resins are prepared by the general technique employed in the preparation of polyester resins. They can be conveniently made by stirring the reactants together and heating them while stirring, to a temperature of $240°C.$, while an inert gas (e.g., nitrogen) is continuously passed through the reaction mixture to remove the low boiling products formed during the esterification reaction. At the end of the esterification reaction, vacuum is applied of about 100 mm. Hg and the ester is polymerized and glycol is distilled off. The polyester resin has a glass transition temperature between $60°$ and $100°C.$ and for adequate flowability of the powder resin composition, the polyester resin component has a molecular weight of less than 25,000 and preferably between 500 and 10,000.

When acrylic resins are used, they are prepared by copolymerizing monomers such as methyl acrylate, ethyl, acrylate, propyl acrylate, butyl acrylate, octyl acrylate, decyl acrylate, lauryl acrylate, methyl methacrylate, ethyl methacrylate, butyl methacrylate, heptyl methacrylate, decyl methacrylate, methyl ethacrylate and the like with acidic co-monomers such as acrylic acid, methacrylic acid, crotonic acid, maleic acid, fumaric acid, itaconic acid and the like, or with alcoholic hydroxy comonomers such as the hydroxyalkyl esters of $\alpha,\beta$-unsaturated mono- and di-basic acids; for example 2-hydroxyethyl acrylate, 2-hydroxypropyl acrylate, 3-hydroxypropyl acrylate, 2-hydroxybutyl acrylate, 8-hydroxyoctyl acrylate, 2-hydroxyethyl methacrylate, 5-hydroxyhexyl methacrylate, 10-hydroxydecyl methacrylate, 2-hydroxyethyl crotonate, bis-(hydroxyethyl) maleate, and the like, or with amide comonomers such as acrylamide, methacrylamide, ethacrylamide, and the like. Additionally, one can make use of other hydroxyl-containing polymerizable monomers such as methylolacrylamide, methylolmethacrylamide and the like. The monomers and ratio of monomers is selected so that the acrylic resin has at least 0.13 percent by weight of alcoholic hydroxyl groups, carboxyl groups and amide groups and not more than 18 percent by weight based on the total weight of acrylic resin, so that the resin has on average at least two reactive hydroxyl, carboxyl or amide groups per molecule, and so that the acrylic resin has a glass transition temperature in the range of 60° to 100°C. The glass transition temperature is a function of the composition of the acrylic resin and its molecular weight. For adequate flowability of the powder resin composition, the molecular weight of the acrylic resin should not be more than 25,000 and preferably it should be between 500 and 10,000.

Still further, one can use such polymerizable compounds in the acrylic resin as styrene, alkyl styrenes such as o-, m- or p-methylstyrene, halostyrenes such as o-, m-, or p-chlorostyrene, acrylonitrile, methacrylonitrile, vinyl chloride, vinylidene chloride and vinyl esters such as vinyl acetate, vinyl propionate or vinyl octoate provided no more than 50 percent by weight of the acrylic resin comprises such monomers and provided that the aforementioned criteria of glass transition temperature, content of reactive groups and molecular weight are met.

The acrylic resins are conveniently made by conventional addition polymerization techniques with free-radical initiators and chain transfer agents to control the molecular weight, in bulk, solution or emulsion systems with recovery of the resin by conventional removal of unreacted monomer, solvent or water.

The weight ratio of aminoplast crosslinking agent to polyester or acrylic resin is in the range of 15:85 to 30:70. Below this range, there is insufficient aminoplast crosslinking agent to provide the degree of crosslinking necessary for adequate physical properties in the cured coating. Above this range, the aminoplast crosslinking agent depresses the sintering temperature of the powder resin composition below 40°C. and impairs the package stability and storability of the powder causing clumping, imperfect fluidization of the powder during application to the substrate, segregation of the powder into varying degrees of density, and decreased gloss in the final coating.

The invention is illustrated by the following examples in which unless otherwise specified, all parts are parts by weight.

Preparation of Aminoplast Crosslinking Agents

Examples 1 to 9 illustrate the preparation of the aminoplast crosslinking agents which are the first component of the curable powder resin composition of the present invention.

EXAMPLE 1

In a suitable reactor, 320 parts by weight of methylated methylolmelamine with a degree of methylolation (i.e. average number of methylol groups per melamine molecule) of 5.5 and a degree of methylation (i.e. average number of methyl groups per molecule of melamine) of 3.0 and a number average molecular weight of approximately 500 are heated to 120°C. and 240 parts of hydrogenated bisphenol are stirred in. When a clear solution forms, 0.2 parts of citric acid are added. The temperature is held at 120°C. and the reaction mixture is distilled until 44 parts have been collected. The residue is discharged into a cold tray. The product has a glass transition temperature of approximately 15°C. measured on a duPont 900 Differential Thermal Analyzer with a heating rate of 20°C. per minute.

EXAMPLE 2

The procedure of Example 1 is repeated with 62 parts of ethylene glycol in place of the hydrogenated bisphenol-A. The resin product has a glass transition temperature of approximately −7°C.

EXAMPLE 3

The procedure of Example 1 is repeated with 320 parts styrene-allyl alcohol copolymer of hydroxyl number 57 in place of the hydrogenated bisphenol-A. The reaction mixture is distilled until 20 parts have been collected. The glass transition temperature of the resin product is 27°C.

EXAMPLE 4

The procedure of Example 1 is repeated with 400 parts of a methylated methylolmelamine with a degree of methylolation of 5.8, a degree of methylation of 5.5, and a number average molecular weight of approximately 400. The glass transition temperature of the resin product is approximately 10°C.

EXAMPLE 5

The procedure of Example 1 is repeated with 475 parts of a butylated methylolbenzoguanamine with a degree of methylolation of 4.0 and a degree of butylation of 2.7 and 240 parts of hydrogenated bisphenol-A. The glass transition temperature of the resin product is 27° to 30°C.

EXAMPLE 6

The procedure of Example 1 is repeated with 137 parts of p-toluenesulfonamide in place of hydrogenated bisphenol-A. The glass transition temperature of the resin product is approximately 15°C.

EXAMPLE 7

The procedure of Example 1 is repeated with 164 parts terephthalamide in place of hydrogenated bisphenol-A. The glass transition temperature of the resin product is 30°–35°C.

EXAMPLE 8

The procedure of Example 1 is repeated with 121 parts benzamide in place of hydrogenated bisphenol-A. The glass transition temperature is 0°–5°C.

EXAMPLE 9

The procedure of Example 1 is repeated with 300 parts of a methylated methylolmelamine with a degree of methylolation of 5.5 and a degree of methylation of 3.0 and 200 parts of p-toluenesulfonamide. The glass transition temperature of the resin product is 29°C.

Preparation and Evaluation of Curable Powder Resin Compositions

In preparing curable powder resin compositions according to the present invention, the reactive polymer and the aminoplast are conveniently mixed at a temperature just above the melting point of the higher melting component in an extruder. The mixture is cooled to solidify it and subsequently crushed and ground in a suitable grinding device such as a pin disc mill to a free-flowing powder having a particle size range of approximately 20–150 microns. The free-flowing powder so obtained can be subjected to a screening treatment to adjust the desired average particle size for the specific type of application to be employed. For test purposes, powders of average particle size of 80 microns are used.

The homogeneous powder resin and compositions may also include various well-known functional modifiers such as grinding aids, curing agents or accelerators, flow control agents, surface active agents, heat-stable organic or inorganic pigments, inert fillers, inhibitors, abrasives and plasticizers in their usual effective proportions.

The acid number of the powder resin composition is in the range of 1 to 18 and preferably in the range of 3 to 10 so that sufficient acid is present to catalyze the interaction of the components of the composition at elevated temperatures but not enough to impair stability at storage temperatures. If there is insufficient acid present in the resin components to provide the required acidity, conventional acid catalysts may be added.

Also, small amounts of other resins or other organic compounds to improve the film-forming properties may be incorporated. It will be understood that the amount of these substances must be such that the physical properties of the powders and cured coating are not impaired.

After application of the coating compositions to the substrate, the coatings are cured at a temperature from 120° to 250°C. for a period of 10 to 60 minutes. The curing treatment is preferably carried out for 20 to 40 minutes at 150° to 200°C. The thickness of the cured film may be varied in the range of 0.5 mil to 20 mil. For test purposes, films of 1.5 mil thickness are used.

In evaluation of the curable powder resin compositions of the present invention, compatibility of the aminoplast and the reactive polymer, the sintering temperature of the powder and the properties of the baked coating are determined. Compatibility of the aminoplast crosslinking agent and the reactive polymer is determined by coating a solution of aminoplast and polymer onto a glass plate. When the solvent has evaporated, the coated film is examined and if it is clear, the aminoplast and polymer are judged to be compatible. All the aminoplasts of Examples 1–9 are found to be compatible with polyester resin A of Example 10 and the acrylic resin of Examples 14 and 15.

The sintering temperature is determined from a standard glass transition temperature curve obtained on a duPont 900 Differential Thermal Analyzer with a heating rate of 20°C. per minute. The lower of the two tangential points of the glass transition temperature is found to correspond to the sintering temperature of the powder since the powder remains free-flowing and unsintered when it is maintained at 3° below this temperature for 2 weeks but sinters within 2 days at this temperature.

Testing of Coated Sheets

The baked cured panels are aged overnight at 77±2°F. and 50 percent relative humidity. The coatings are evaluated for appearance including pinholes, craters and abnormal roughness. They are tested by the following procedures:

a. Impact Test

The reverse impact test involves a two-pound rod with a nominal diameter of 1 inch and a length of 18 inches having a hemispherical tip of ½ inch radius. The rod is dropped vertically a certain number of inches on the uncoated side of the panel and the ability of the panel to deform is measured versus the ability of the coating to withstand this deformation without cracking. The panel on impact deforms into a cup deformation. The rounded cup is tested by placing a pressure-sensitive cellophane tape of 0.5 inch in width over the raised cup. The cellophane tape is stripped to determine whether or not the coating has lost its adhesion during the deformation. The rod is dropped from various heights and the test has a readout of inch-pounds versus adhesion of the coating.

b. Rub Test

A pool of solvent is placed on the coated panel. The coating is rubbed gently with a cheesecloth covered finger. The number of rubs before the coating begins to be removed is noted.

c. Pencil Hardness Test

The coated side of the panel is placed face-up on a flat surface. The operator presses on the panel with pencils of varying hardness. The panel fails when the lead penetrates the coating and the hardness rating is determined by that hardness which does not penetrate. The range of hardness for pencils ranges from 6B, being the softest, to 9H, being the hardest, i.e., 6B to B, HB, F, H to 9H. The combination coatings taught vary in hardness from F to 6H. Hardness of 2H or better is preferred.

EXAMPLE 10

A powder resin composition is prepared from the following ingredients blended at 100°C. for 3 minutes in an extruder.

|  | Parts by Weight |
| --- | --- |
| Polyester Resin A | 250 |
| Aminoplast Product of Ex. 5 | 108 |
| Titanium Dioxide | 250 |
| MODAFLOW RESIN MODIFIER (product of Monsanto Company) | 0.8 |

The polyester Resin A is the reaction product of isophthalic acid neopentyl glycol and trimethylolethane with a 20 percent excess equivalent hydroxyl, an acid number of 6.9 and a glass transition temperature of 72°C. and a number average molecular weight of 2,000.

The sintering temperature of the powder resin composition is 42°C. The weight ratio of aminoplast to polyester is 30:70.

Mild steel panels are coated with the powder resin composition by the electrostatic spray-coating method and baked at 175°C. for 30 minutes. The baked coating has a forward impact of 45 inch-pounds, a reverse impact of 23 inch-pounds and a methyl ethyl ketone rub value of more than 200.

EXAMPLE 11

A powder resin composition is prepared from the following ingredients blended at 100°C. for 3 minutes in an extruder.

|  | Parts by Weight |
| --- | --- |
| Polyester Resin A | 250 |
| Aminoplast Product of Ex. 2 | 63 |
| MODAFLOW RESIN MODIFIER | 0.8 |

The sintering temperature is 40°C. The weight ratio of aminoplast to polyester is 20:80.

EXAMPLE 12

|  | Parts by Weight |
|---|---|
| Polyester Resin A | 250 |
| Hexamethoxymethylmelamine | 63 |
| MODAFLOW RESIN MODIFIER | 0.8 |

The weight ratio of aminoplast to polyester is 20:80. The sintering temperature is below room temperature, so that it is impossible to grind or spray the composition under normal conditions.

EXAMPLE 13

A powder resin composition is prepared from the following ingredients blended at 100°C. for 3 minutes in an extruder.

|  | Parts by Weight |
|---|---|
| Polyester Resin A | 250 |
| Hexamethoxymethylmelamine | 29 |
| Titanium Dioxide | 250 |
| MODAFLOW RESIN MODIFIER | 0.8 |

The weight ratio of aminoplast to polyester is 10:90. The sintering temperature of the powder resin compound is approximately 25°C.

Mild steel panels were coated with the powder resin composition by the electrostatic spray-coating method and baked at 175°C. for 30 minutes. The baked coating has a forward impact of 20 inch-pounds, a reverse impact of less than 10 inch-pounds, and an MEK rub value of 50.

A comparison of Examples 10–13 illustrates that powder resin compositions containing the aminoplast crosslinking agents of the present invention have adequate sintering temperatures for package stability and yield coatings sufficiently cured for adequate impact strength and solvent resistance. In contrast, compositions containing hexamethoxymethylmelamine have poor package stability and as in Example 13 when the amount of hexamethoxymethylmelamine is reduced to raise the sintering temperature, a drastic loss in impact strength and solvent resistance is observed.

EXAMPLE 14

A powder resin composition is prepared from the following ingredients blended in a Banbury mixer at 100°C. for 15 minutes.

|  | Parts by Weight |
|---|---|
| Acrylic Resin B | 250 |
| Aminoplast Product of Ex. 9 | 63 |
| Titanium Dioxide | 250 |
| MODAFLOW RESIN MODIFIER | 0.8 |

The weight ratio of aminoplast to acrylic resin is 20:80. The sintering temperature of the resin composition is approximately 54°C.

The acrylic resin B is an addition copolymer of 14.7 parts by weight of styrene, 46 parts by weight of methyl methacrylate, 10.4 parts by weight of 2-hydroxyethyl methacrylate and 28.9 parts by weight of butyl methacrylate. The glass transition temperature is approximately 58°C.

Mild steel panels are coated with the powder resin by means of electrostatic spray-coating and baked at 175°C. for 30 minutes. The baked panel has a forward impact resistance of 4 inch-pounds and an MEK rub value of 200.

EXAMPLE 15

A powder resin composition is prepared from the following ingredients blended in a Banbury mixer at 100°C. for 15 minutes.

|  | Parts by Weight |
|---|---|
| Acrylic Resin C | 250 |
| Aminoplast Product of Ex. 9 | 63 |
| Titanium Dioxide | 250 |
| MODAFLOW RESIN MODIFIER | 0.8 |

The weight ratio of aminoplast to acrylic is 20:80. The acrylic Resin C is an addition copolymer of 19.5 parts by weight of styrene, 46 parts by weight of methyl methacrylate, 5.6 parts by weight of acrylamide and 28.9 parts by weight of butyl methacrylate. The glass transition temperature is >60°C.

The sintering temperature of the powder resin composition is >55°C.

Mild steel panels are coated with the powder resin by means of electrostatic spray coating and baked at 175°C. for 30 minutes. The baked panel has a forward impact resistance of 4 inch-pounds and an MEK rub value of 200.

What is claimed is:

1. A curable powder resin composition with a sintering temperature above 40°C. and curable in the temperature range of 120° to 220°C., comprising:
    A. from about 15 to 30 parts by weight of a condensate of a methylolamino compound, an aliphatic alcohol containing from 1 to 4 carbon atoms and an aromatic sulfonamide of number average molecular weight less than 500; wherein the methylolamino compound is a methylolurea or methylolaminotriazine containing no more than one unmethylolated N-H bond per molecule, wherein the molar ratio of aliphatic alcohol to methylolamino compound is at least 2, wherein the molar ratio of the methylolamino compound to the aromatic sulfonamide is from about 1:0.5 to about 1:2 when the reactive compound contains one reactive group per molecule and is from about 1:0.5 to about 1:1.5 when the aromatic sulfonamide contains 2 or more reactive groups per molecule, wherein at least about 50 percent of the methylol groups of the methylolamino compound have been condensed with the aliphatic alcohol or the aromatic sulfonamide and wherein the glass transition temperature of the condensate is in the range of from −10° to 100°C.; and
    B. from about 85 to 70 parts by weight of a polyester resin or an acrylic resin wherein the resin has a glass transition temperature in the range of from 60° to 100°C., and a number average molecular weight in the range of 500 to 25,000, and contains alcoholic hydroxyl groups, carboxyl groups or amide groups, heat reactive with the condensate of the methylolamino compound, wherein the polyester resin has an acid number in the range of 1 to 25 or a hydroxyl number in the range of 11 to 200, and wherein the acrylic resin contains from 0.13 to 18 percent by weight of hydroxyl, carboxyl, or amide groups.

2. The curable powder resin composition of claim 1 wherein the methylolamino compound is a methylolmelamine, a methylolurea or a methylolbenzoguanamine, and wherein the aromatic sulfonamide is selected from the group consisting of benzenesulfonamide, o-, m-, and p-toluenesulfonamide, and terephthalsulfonamide.

3. The curable powder resin composition of claim 1 wherein the methylolamino compound is a methylolmelamine, the aliphatic alcohol is methanol and the reactive compound is selected from the group consisting of o-, m-, and p-toluenesulfonamide.

4. The curable powder resin composition of claim 1 wherein the sintering temperature is in the range of 40°–100°C., wherein the glass transition temperature of the condensate is in the range 10° to 80°C., and wherein the molecular weight of the polyester resin or the acrylic resin is in the range of 500 to 10,000.

5. The curable powder resin composition of claim 1 wherein the molar ratio of the methylolamino compound to the reactive compound is between about 1:1 and about 1:2 when the reactive compound contains one reactive group per molecule and is between about 1:0.5 and about 1:1 when the reactive compound contains 2 or more reactive groups per molecule.

6. A curable powder resin composition with a sintering temperature in the range of 40° to 100°C., and curable in the temperature range of 120° to 220°C., comprising:

A. from about 15 to 30 parts by weight of a condensate of a methylolmelamine, an aliphatic alcohol containing from 1 to 4 carbon atoms and toluenesulfonamide, wherein the methylolmelamine contains no more than one unmethylolated N-H bond per molecule, wherein the mole ratio of the aliphatic alcohol to the methylolmelamine is at least 2, wherein the molar ratio of the methylolmelamine to the toluenesulfonamide is from about 1:0.5 to about 1:2, wherein at least about 50 percent of the methylol groups of the methylolmelamine have been condensed with the aliphatic alcohol or the toluenesulfonamide and wherein the glass transition temperature of the condensate is in the range of from −10° to 100°C; and B. from about 85 to 70 parts by weight of a polyester resin or an acrylic resin wherein the resin has a glass transition temperature in the range of 500 to 25,000, and contains alcoholic hydroxyl groups, carboxyl groups or amide groups, heat reactive with the condensate of the methylolamino compound, wherein the polyester resin has an acid number in the range of 1 to 25 or a hydroxyl number in the range of 11 to 200, and wherein the acrylic resin contains from 0.13 to 18 percent by weight of hydroxyl, carboxyl, or amide groups.

* * * * *